Figure 1:
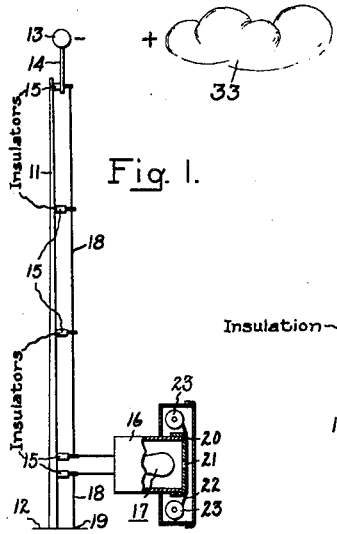

July 24, 1934.   H. B. MARVIN   1,967,895
ELECTROSTATIC POTENTIAL DIFFERENCE MEASURING DEVICE
Filed July 27, 1932   2 Sheets-Sheet 1

Inventor:
Harry B. Marvin,
by Charles E. Tullar
His Attorney.

July 24, 1934.   H. B. MARVIN   1,967,895
ELECTROSTATIC POTENTIAL DIFFERENCE MEASURING DEVICE
Filed July 27, 1932   2 Sheets-Sheet 2
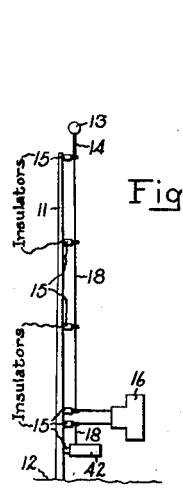
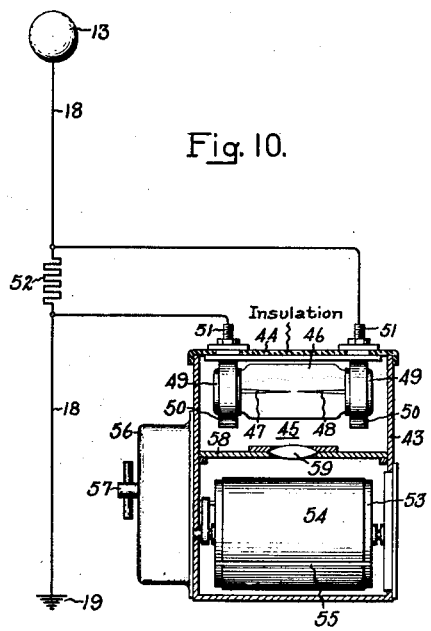
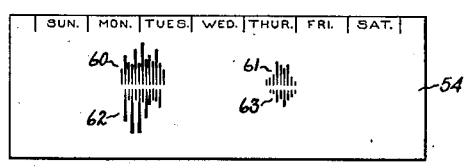
Inventor:
Harry B. Marvin,
by Charles E. Tullar
His Attorney.

Patented July 24, 1934

1,967,895

UNITED STATES PATENT OFFICE 1,967,895

ELECTROSTATIC POTENTIAL DIFFERENCE MEASURING DEVICE

Harry B. Marvin, Schenectady, N. Y., assignor to General Electric Company, a corporation of New York Application July 27, 1932, Serial No. 625,170

19 Claims. (Cl. 234—1.5)

My invention relates to electrostatic potential difference measuring devices. The general object of my invention is to provide a method of and an apparatus for producing a record which is a measure of the electrostatic potential difference between two spaced apart electrically charged members. The principal object of my invention, however, is to provide a method of and an apparatus for producing a record which is a measure of the severity of a lightning discharge in a given locality, and/or which is a measure of the integrated severities of a plurality of lightning discharges during a given period in a given locality. Another important object of my invention is to provide a method of determining the relative lightning hazards to which a plurality of different localities are exposed during a given period. A more specific object of my invention is to provide a lightning severity meter. Other objects and aims of my invention, together with the inherent advantages thereof, will in part be obvious and in part specifically adverted to during the course of this specification.

Although the general object of my invention is to provide a method of and an apparatus for producing a record which is a measure of the electrostatic potential difference between two spaced apart electrically charged members, yet at present I believe that the most practical application of my invention is its use as a lightning severity meter. In explaining the underlying principles of my invention, reference will, therefore, be made to a method and an apparatus adapted for this purpose, but I wish it clearly understood that my invention is not restricted to this specific field.

Lightning is still the most important single factor causing interruptions in the flow of electric current supplied through long distance transmission lines. A direct stroke of lightning to the transmission lines, or a very high voltage induced therein by a nearby lightning discharge, will nearly always cause a trip out of the protective devices connected to the lines, thus causing an interruption in the flow of current. The uninterrupted flow of current supplied through transmission lines is very desirable for the electric power company operating the lines and for the consumers using the current. In their effort to improve the quality of their service, many electric power companies frequently make changes which they believe will reduce the number of trip outs on their transmission system caused by lightning. These changes may, for example, consist of the installation of an overhead ground wire, or the changing of the footing resistance of the steel towers, or of the ground wires, or of both. In order to reach a satisfactory and convincing conclusion as to the value of any change made for the purpose of reducing the number of trip outs it is necessary, when comparing the number of trip outs before and after the change was made, to take into account a very important and unknown variable, namely, the severity of the lightning storms before and after the change was made. For example, assume that a change is made which will reduce the number of trip outs if the severities of the lightning storms after the change are not greater than those before the change was made. However, it might happen that the severities of the lightning storms after the change are so much greater than those before the change was made that there are more trip outs after the change than before the change was made. If the person responsible for making the change is unaware of the fact of the increased severities of the lightning storms after the change was made, he might readily conclude that he made a harmful change, whereas in fact he made a beneficial change. On the other hand, this person might make a harmful change, but it might happen that the severities of the lightning storms after the change are so much smaller than those before the change was made, that the number of trip outs after the change are less than those before the change was made. If this person is unaware of the fact of the decreased severities of the lightning storms after the change was made, he might readily conclude that he made a beneficial change, whereas in fact he made a harmful change. These changes are usually quite expensive to make, hence those in charge are reluctant to make them unless they are convinced that they will be beneficial. It is evident that no intelligent and constructive progress can be made in the direction sought unless it is possible to obtain a reliable comparison of the lightning severities before and after the change was made. Furthermore, when a new transmission system is to be erected it is usually possible to carry the lines through any one of several proposed routes. For obvious reasons, it is desired to employ that route in which the transmission lines will be subjected to the least lightning hazard. It therefore became desirable to provide a lightning severity meter; i. e., a meter that will produce a record which is a measure of the intensity of a single lightning storm in its vicinity, and/or which is a measure of the integrated severities of a plurality of lightning storms in its vicinity during a given period. My invention provides a method for producing the desired record and a lightning severity meter for carrying my method into effect.

Briefly described, my method of producing a record which is a measure of the severity of a lightning discharge in a given locality consists in accumulating prior to the lightning discharge in the locality a quantity of electricity which is a function of the intensity of the electrostatic field between the electrically charged cloud and the earth just prior to the lightning discharge, draining the accumulated quantity of electricity after the lightning discharged utilizing the electricity being drained to produce a beam of actinic rays whose intensity and duration are functions of the quantity of accumulated electricity and the rate at which the latter is drained, exposing a sensitized element to the beam of actinic rays to obtain a latent figure, and developing the exposed sensitized element to obtain a visible figure. The severity of the lightning stroke is a function of the intensity and time rate of change of the electrostatic field between the cloud and the earth, and the density of the developed figure is also a function of these two factors; hence, the density of the figure is a measure of the severity of the lightning discharge. Similarly, the severity of a lightning storm is a function of the intensity and time rate of change of the electrostatic field between the cloud and the earth accompanying each lightning stroke, and the number of strokes during the storm. By exposing the sensitized element over a given period, each lightning discharge produces an exposure of the element to a beam of actinic rays, and since the effect of the superposed exposures is approximately the same as a single exposure for the same integral illumination time product, the density of the developed figure is a measure of the integrated lightning severities during this period.

A preferred embodiment of my lightning severity meter for carrying my method into effect consists of an electrically conducting member so supported in the earth's atmosphere that it is exposed only to the electrostatic field in the atmosphere, this conducting member being connected to the earth through a resistance. Across the resistance is connected a glow tube adapted to emit actinic rays when a voltage in excess of a predetermined value is impressed thereon. This glow tube is supported in a light-proof receptacle which also supports a sensitized element so arranged that a beam of the actinic rays will impinge thereon. The operation of my meter is such that when an electrically charged cloud is approaching it, or forming in its vicinity, the voltage impressed on the glow tube is insufficient to cause its operation, but when the cloud suddenly discharges in the vicinity of the meter, as by a lightning stroke, the voltage impressed on the glow tube is sufficient to cause its operation, thus producing a latent figure on the sensitized element. The sensitized element is then developed to produce a visible figure and the density of the figure is measured by a densitometer.

My invention, however, will best be understood from the following description when considered in connection with the accompanying drawings, while those features of my invention which are believed to be novel and patentable are pointed out in the appended claims.

Figure 2:
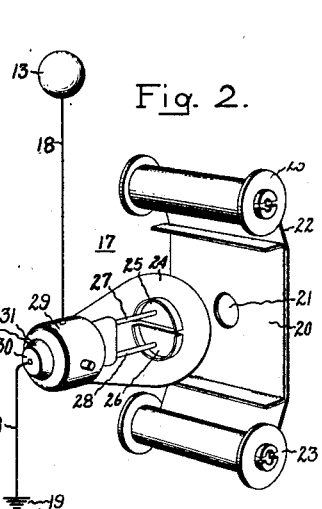
Figure 3:
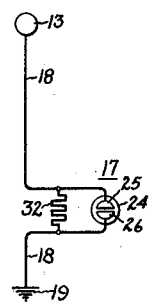
Figure 4:
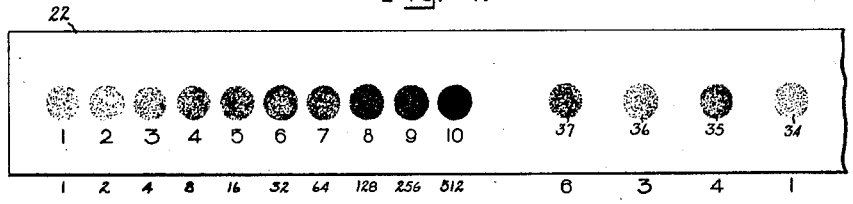
Figure 5:
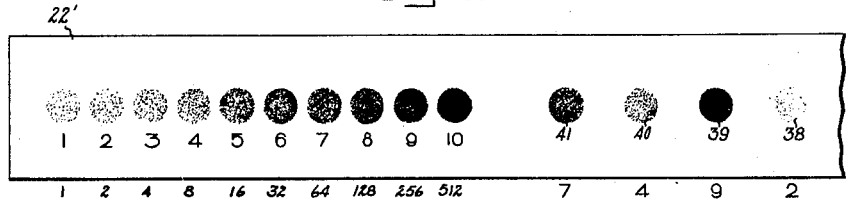
Figure 8:
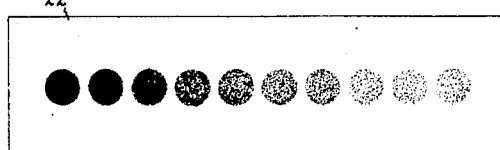
Figure 6:
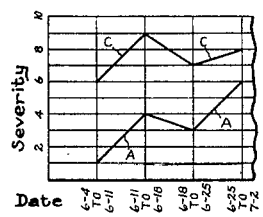
Figure 7:
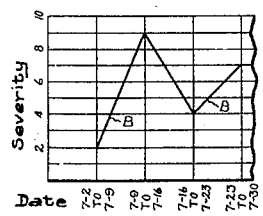

Fig. 1 of the drawings represents a view, partly in elevation and partly in section, showing the general arrangement of the various parts of a preferred form of my lightning severity meter. Fig. 2 is an enlarged view of the mechanism inside the light-proof receptacle of my meter. Fig. 3 is a diagram of the equivalent electrical connections of my meter. Figs. 4 and 5 represent sensitized elements with figures that were developed from the latent figures produced on the elements by exposure thereof in my meter, and with other developed figures useful for explaining my invention. Figs. 6 and 7 represent graphic records of the lightning hazards at the same locality during different periods, or at different localities during the same period, as determined by using my meter. Fig. 8 represents a sensitized element with developed figures useful for explaining the advantages of my invention. Fig. 9 represents a modification of my invention in which the electrically conducting member supported in the earth's atmosphere is connected to a metallic plate which is supported a slight distance above the earth, thus forming what is commonly called a "counterpoise". Fig. 10 represents a view, partly in elevation and partly in section, of a modification of my lightning severity meter which employs a moving sensitized element to obtain a plurality of latent figures during a given period, each figure being a measure of the severity of a different lightning discharge during this period. Fig. 11 represents a sensitized element with figures that were developed from the latent figures produced on the element by exposure thereof in the meter shown in Fig. 10. Similar parts in the various figures are represented by the same reference characters.

In Fig. 1, a pole represented by 11 is set into the earth 12 in a vertical position, as shown. This pole may be of any insulating material and may extend to any desired height above the surface of the earth, but is preferably made of wood, and the top of the pole is preferably 30 or 40 feet above the surface of the earth. An electrically conducting member 13, as, for example, a brass sphere, is secured to a metallic rod 14, which is preferably so secured to an insulator 15 mounted on pole 11 that sphere 13 is slightly above the top of the pole. Near the earth is a light-proof receptacle 16 in which is mounted an electric discharge device 17 which is adapted to emit actinic rays when a voltage in excess of a predetermined value is impressed thereon. This discharge device is connected in series with a lead 18 which is secured to insulators 15 mounted on pole 11, one end of this lead being connected to rod 14 and the other end being grounded as shown at 19. It is obvious that sphere 13 and the upper portion of lead 18 form an antenna, and the term "antenna" will hereinafter be used for describing the combination of these two elements. Inside of receptacle 16 there is mounted in front of the discharge device 17 an opaque plate 20 having a hole 21 for permitting a beam of the actinic rays from the discharge device to impinge upon a portion of a sensitized film 22 which rests on the side of the plate farthest from the discharge device. This film has its ends wound on rollers 23, which are rotatably mounted inside of receptacle 16.

Fig. 2 clearly shows the structure of the electric discharge device 17, the connections thereto, and the arrangement thereof with respect to plate 20, film 22, and rollers 23. It can readily be seen that when the electric discharge device 17 emits actinic rays, a beam of these rays will pass through the hole 21 in plate 20 and will impinge on that portion of film 22 which is visible through the hole, and that by winding up one or the other of rollers 23 the film 22 can be moved so as to expose a different portion thereof to this beam of actinic rays. The electric discharge device 17 may be of any type that is adapted to emit actinic rays when a voltage in excess of a predetermined value is impressed thereon. By actinic rays, I mean any kind of visible or invisible rays which will produce a latent image on a sensitized element when the rays impinge thereon. I have used with excellent success a discharge device known to the electrical art as a "glow tube", and, therefore, I will describe the operation of my meter in connection with such a tube; but I wish it clearly understood that my invention is not limited to the use of this tube. The glow tube 17 consists of a glass bulb 24, in which there are two spaced apart, flat, semi-circular electrodes 25 and 26 which are supported by metallic stems 27 and 28, respectively. These stems also make electrical connection between the electrodes and the terminals of the tube on its base. The base of the tube may be of the screw or bayonet type, but the latter is shown for simplicity. One terminal of the base is represented by the cylindrical metallic shell 29, and the other terminal is represented by the flat circular plate 30, the two terminals being separated by insulation 31. I will assume that terminal 29 is connected to electrode 25 by stem 27, and that terminal 30 is connected to electrode 26 by stem 28. The bulb 24 is filled with some gas that will emit actinic rays when it glows, as for example, Neon gas. One of the characteristics of this tube is such that no glow is produced until the voltage impressed on its electrodes exceeds a predetermined value, which I will hereafter call the critical tube voltage. When the critical tube voltage is exceeded, the gas at the cathode glows, the cathode electrode being that electrode which is at negative polarity during the period of operation of the tube. The glow of the gas occurs over the entire surface of the cathode electrode which faces film 22, hence it is obvious that irrespective of which electrode is the cathode there will be a beam of actinic rays impinging on that portion of film 22 which is visible through hole 21 in plate 20. The character and thickness of insulation 31 is such as to form a high resistance electrically conducting path directly between terminals 29 and 30, hence it is clear that the equivalent electrical connections of my meter are as shown in Fig. 3, in which 32 represents a high resistance in series with lead 18, which connects sphere 13 to the earth at 19, and 25 and 26 are the electrodes of tube 17 connected across this resistance.

I will now describe the operation of my meter in connection with Figs. 1, 2, and 3. It is clear that if there is no electrically charged cloud in the vicinity of the meter, there will be no electrical charge on the antenna except that due to the small and practically steady electrostatic field which is always present in the atmosphere, even on cloudless days. This small and steady charge on the antenna is incapable of effecting the operation of my meter, hence, in order to simplify the remainder of the explanation I will assume that there is no charge on the antenna when them is no electrically charged cloud in its vicinity. Now assume that a positively charged cloud, represented by 33 in Fig. 1, is approaching or forming in the vicinity of the meter. By electrostatic action, the positively charged cloud 33 causes the antenna to become negatively charged, this charge consisting of a flow of electrons from earth 12 up through the lower section of lead 18, insulation 31, and into the upper section of lead 18 and sphere 13, this flow of electrons really constituting a dynamic flow of electricity, as is well understood in the art. While the cloud is approaching or forming in the vicinity of the meter, the electrons flow from the earth into the antenna at such a relatively low rate that the voltage drop across insulation 31 is below the critical voltage of the tube; hence the latter does not glow and no latent figure is produced on film 22. The same will be true if the charged cloud moves away from the vicinity of the meter, because this will cause the electrons to flow back from the antenna to the earth at such a relatively low rate that the voltage drop across insulation 31 will be below the critical voltage of the tube. Suppose, however, that the cloud suddenly discharges when it is in the vicinity of the meter, as, for example, by a stroke of lightning. This causes the electrons to flow back from the antenna to the earth at such a relatively high rate that the voltage drop across insulation 31 exceeds the critical voltage of the tube, thus producing a glow at electrode 25, since the latter is the cathode when the electrons flow from the antenna to the earth. This glow produces a latent figure on film 22 which is later removed from receptacle 16 and developed to obtain a visible figure in the usual manner well known to those skilled in the art of photography. The film 22 may be provided in any form that permits daylight loading and removing from receptacle 16, as, for example, the daylight roll film holder well known to photographers.

The severity of the lightning stroke is a function of the magnitude of the charge in the cloud and the height of the latter above. the earth just prior to the stroke, and the time rate of change of the charge in the cloud during the stroke. The first two factors determine the electrostatic potential difference and the intensity of the electrostatic field between the cloud and the earth just prior to the stroke. The magnitude of the charge on the antenna just prior to the stroke is a function of the intensity of the electrostatic field between the cloud and the earth just prior to the stroke, the capacitance of the antenna and the height of the latter above the earth. The initial magnitude of the electron flow from the antenna through insulation 31 to the earth, and the rate at which this magnitude decreases, are functions of the magnitude of the charge on the antenna just prior to the stroke, the capacity of the antenna just prior to the stroke, the capacity of the antenna, and the resistance of insulation 31. This is analogous to the well known discharge characteristics of a condenser through a resistance. The capacity of the antenna and the resistance of insulation 31 are substantially constant; hence, the magnitude of the charge on the antenna just prior to the stroke determines the magnitude of the current flowing through tube 17 at the instant the stroke occurs, and also determines the magnitude of the current flow and the period during which this current flows through tube 17 as the electrons flow back from the antenna to the earth. The area of the glow at the cathode electrode in tube 17, in this case electrode 25, is substantially constant, hence, the intensity of the glow increases as the magnitude of the current flowing through the tube increases, and vice versa. The exposure of film 22 is substantially directly proportional to the product of the intensity of the glow of tube 17 and the period of the glow. From the above description it should be obvious that the exposure of film 22 to the actinic rays of tube 17 is a function of the severity of the lightning stroke, and, therefore, if film 22 is developed the density of the developed figure will be a function of the severity of the lightning stroke. Although I have described the operation of my meter with a positively charged cloud, it will be obvious from this description that the operation will be identical with a negatively charged cloud, the only difference being that the antenna will become positively charged and the glow will be at electrode 26 in tube 17. It should now be clear that the exposure of film 22 to the actinic rays of tube 17, and, therefore, the density of the developed figure on the film, is a function of the severity of a lightning stroke, whether the stroke is due to a positively or negatively charged cloud.

If it is desired to compare the severities of individual lightning storms, then after each storm the film 22 will be advanced, and after several storms, for example four, the film 22 will be removed and developed. Assuming that the four lightning storms varied in severity, the developed figures will vary in density and may be represented, for example, by 34, 35, 36 and 37 in Fig. 4. The densities of these figures can be measured by a densitometer, which is an instrument that directly measures the optical density of any substance. It is unnecessary to describe this instrument, since its function and the method of operating it to measure the optical density of a substance are well understood by those skilled in the art to which this invention pertains. By comparing the densities of figures 34, 35, 36 and 37, the severities of the four lightning storms can be compared. It is obvious that the density of each developed figure is also a measure of the electrostatic potential difference between the antenna and the earth just after the occurrence of the particular lightning discharge which produced the latent figure from which the developed figure was obtained.

I will assume, however, that it is desired to compare the integrated severities of the lightning strokes occurring during different periods, as, for example, during four consecutive weeks. The film 22 will then be left in one position for a week. Each lightning stroke that occurs during the week will expose the same portion of the film to a beam of actinic rays from tube 17, and the effect of the superposed exposures is approximately the same as a single exposure for the same integral illumination time product; hence, when this portion of the film is developed, the density of the developed figure will be a function of the integrated severities of the lightning storms that occurred during the week. At the end of each week the film will be advanced, and at the end of four weeks the film will be removed from the receptacle and developed. I will assume that the four developed figures are, for example, represented by 34, 35, 36 and 37 in Fig. 4. By measuring and comparing the densities of these figures, the integrated severities of the lightning storms that occurred during the four weeks are compared with each other. It is obvious that by using a sufficiently long film, advancing it at regular intervals during the entire lightning season, developing the film at the end of the lightning season, and measuring the densities of the developed figures, it is possible by comparing the densities of the figures to compare the integrated severities of the lightening storms that occurred during different periods of the lightning season.

It is usually desirable, however, not to wait until the end of the lightning season, but to make several comparisons during the season, thus requiring the use of several films during the season. If there is a variation between the silver salt emulsions on the various films, or between the strengths of the solutions used for developing the films, or between the periods during which the films are left in the developing solution, then an error will be introduced, since the same integral illumination time product exposure of two films will produce different density figures on the films, and, conversely, different integral illumination time product exposures of two films may produce the same density figures on the films. This possible error may be avoided in the following manner:

Advance film 22 at the end of each period, as, for example, at the end of each week, but leave a certain length of the film near one end unexposed in the meter; thus, in Fig. 4 for example, no part of the film between figure 37 and the left hand end of the film should be exposed in the meter. Remove film 22 from the meter and insert another film therein. Do the following in a photographer's dark room: Place an opaque plate similar to plate 20 in Fig. 2 over the film 22 in Fig. 4, near the left-hand end thereof, thus leaving a circular portion of the film visible through hole 21 in the plate. Place a glow tube in front of the opaque plate. It is satisfactory to use a glow tube as represented by 17 in Fig. 2. Charge a condenser up to some definite value, as, for example, 20 microcoulombs. Discharge the condenser through the glow tube, allowing the beam of actinic rays produced by the tube to impinge on the portion of the film visible through hole 21, but not allowing any of the rays from the tube to impinge on any other portion of the film. Move film 22 slightly to the left, thus leaving a second portion of the film visible through hole 21. Recharge the condenser to 20 micro-coulombs, discharge the condenser through the glow tube, again recharge the condenser to 20 micro-coulombs, and again discharge the condenser through the tube. Each discharge of the condenser exposes this second visible portion of the film to a beam of actinic rays from the glow tube, thus producing two superposed exposures of this portion of the film. Move film 22 to the left to expose consecutively eight more portions of the film through hole 21, and at these portions repeat the charging and discharging of the condenser through the glow tube, 4, 8, 16, 32, 64, 128, 256 and 512 times, respectively. Develop the entire film 22 in Fig. 4, thus producing figures 34, 35, 36, and 37, and also producing figures with graduated densities, as shown by 1 to 10, inclusive, on this film. The numbers 1 to 512, inclusive, under figures 1 to 10, respectively, indicate the number of times that the portion of the film designated by a given figure was exposed to a beam of actinic rays from the glow tube; hence, it should be clear why figure 1 has the least density, figure 10 has the greatest density, and the other figures have intermediate graduated densities. If the densities of these figures are measured and the values plotted against the number of exposures made for producing the figures, it will be found that there is a definite relationship between the densities and the exposures, hence it will be obvious that there will also be a definite relationship between the densities of the figures and the number of the figures. For this reason, and the additional reason that figures 1 to 10, inclusive, are on the same film with figures 34 to 37, inclusive, and are developed for the same period in the same developing solution, the figures 1 to 10, inclusive, can be used as a group of arbitrary but standard lightning severities, and the lightning severities of figures 34 to 37, inclusive, can be determined by comparing their densities with those of figures 1 to 10, inclusive. Thus, assume that the densities of all the figures on film 22 have been measured and it is found that the densities of figures 34, 35, 36 and 37 are the same as the densities of figures 1, 4, 3 and 6, respectively. The lightning severities of figures 34, 35, 36 and 37 are, therefore, 1, 4, 3 and 6, respectively, as shown by the numbers under the figures. It is, therefore, satisfactory to speak of figures 1 to 10, inclusive, as the lightning severity tablets, and they will so be called in order to simplify the remaining description of my invention. It is obvious that if the density of a lightning severity figure is between the densities of two lightning severity tablets, the severity number to be assigned to the lightning severity figure can be obtained by interpolation.

Now assume that the new film that was inserted in the meter was advanced at the end of each week for four consecutive weeks and a certain length of this film near one end was unexposed in the meter. This unexposed film length should be treated in the same manner as previously described with the unexposed length of film 22. Assuming that this has been done and the new film developed, the latter may be represented by 22' in Fig. 5, where 1 to 10, inclusive, are the lightning severity tablets, and 38 to 41, inclusive, are the developed figures whose respective densities are functions of the integrated severities of the lightning storms that occurred during each successive week. Assume that the densities of all the figures on film 22' have been measured and it is found that densities of figures 38, 39, 40 and 41 are the same as the densities of figures 2, 9, 4 and 7, respectively. The lightning severities of figures 38, 39, 40 and 41 are, therefore, 2, 9, 4 and 7, respectively, as shown by the numbers under the figures.

In order more clearly to illustrate the advantages of my method, I have shown figures 1 to 10, inclusive, on film 22' in Fig. 5 as having a slightly less density than figures 1 to 10, respectively, on film 22 in Fig. 4. As previously explained, this may be caused by a difference between the silver salt emulsions on the films, or a difference between the developing solutions used for developing the films, or a difference between the periods the films are left in the developing solutions, or in a combination of any of these differences. It should be obvious that since figures 1 to 10, inclusive, and figures 38 to 41, inclusive, in Fig. 5 are on the same film and are developed in the same developing solution for the same period, the actual densities of the figures is immaterial; it is their relative densities that determines the number of the lightning severity tablet that should be assigned to each of figures 38 to 41, inclusive. The lightning severity tablet numbers assigned to figures 38 to 41, inclusive, on film 22' are, therefore, accurate, irrespective of the actual densities of the figures on this film. It is, therefore, clear that an accurate comparison may be made between the lightning severities of each of figures 38 to 41, inclusive, on film 22', and between the lightning severities of each of these figures and the lightning severities of each of figures 34 to 37, inclusive, on film 22. It should now be obvious that my method provides an arbitrary but simple and reliable measurement of the severity of an individual lightning stroke and/or the integrated severities of a plurality of lightning strokes during a given period.

In Fig. 6, the zigzag line A represents the lightning severities of figures 34 to 37, inclusive, on film 22, and in Fig. 7 the zigzag line B represents the lightning severities of figures 38 to 41, inclusive, on film 22'. In each of Figs. 6 and 7, the ordinate represents the lightning severity tablet numbers, and the abscissa represents the weekly periods during which the film was exposed in the meter. By comparing lines A and B, it is possible to determine at a glance during which period the average lightning severity was the greatest.

Now assume that it is desired to make some change in a transmission line system which it is believed will reduce the number of trip outs on the system caused by lightning strokes, but it is desired to know whether the difference between the number of trip outs before and after the change was made is due to the change or due to a difference between the severities of the lightning storms before and after the change was made. This can readily be determined in the following manner: At least one meter, but preferably several meters, the number depending on the length of the transmission system, should be installed in various localities along the transmission system so as to be exposed only to the electrostatic field in the atmosphere. This may be accomplished by installing the meters sufficiently near to the transmission system so as to be affected by a charged cloud which might cause a trip out of the transmission lines when it discharges by a lightning stroke, and at the same time the meters should be installed far enough from the transmission system so as not to be affected by the electrostatic field from the current carrying lines, or be affected by the metal transmission towers. Let A in Fig. 6 also represent the average lightning severities at the various localities where the meters are located during a period of four weeks before the change is made to the transmission system, and let B in Fig. 7 also represent the average lightning severities at these localities during a period of four weeks after the change was made. I will also assume that a record kept of the number of trip outs before and after the change was made shows that during the four weeks after the change there were less trip outs than during the four weeks before the change was made. In spite of this fact, however, it is seen by comparing lines A and B in Figs. 6 and 7, respectively, that the average lightning severity during the four week period after the change was made was greater than that during the four week period before the change was made, hence proving that the change made to the transmission system was responsible for the decreased number of trip outs, and, therefore, proving that a beneficial change was made to the transmission system.

Now assume that it is desired to determine which one of two proposed routes for a new transmission system will expose the system to the least lightning hazard. This can be determined readily in the following manner: Several of my meters should be installed in various localities along each proposed route. Let A in Fig. 6 also represent the average lightning severities during a four weeks period at the various localities along one route where the meters are located, and let the zigzag line C in Fig. 6 represent the average lightning severities during this four weeks period at the various localities along the second route where the meters are located. By comparing lines A and C in Fig. 6, it is seen that the average lightning severity in the first route is less than that in the second route during the same period, hence it is obvious that the first route will subject the proposed transmission system to a smaller lightning hazard than the second route, and therefore it will be preferable to erect the transmission system over the first route. It is, of course, obvious that these tests will preferably be conducted over longer periods than four weeks in order to obtain a thoroughly reliable conclusion, but I have used four weeks merely as illustrative of the principle, and not as a definite period.

Now, assume that it is desired to determine which one of several proposed sites for a new ammunition depot, or for a new explosive material plant, or for a new oil refinery, or for a new group of oil storage tanks, will subject the particular installation to the least lightning hazard. It should be obvious that this may readily be determined by installing one or more of my meters at each of the proposed sites and obtaining records similar to those shown in Fig. 6.

I have described how to produce lightning severity tablets 1 to 10, inclusive, on films 22 and 22' in Figs. 4 and 5. Obviously, it is desirable not to go through the comparatively long process of separately producing the latent figure for each tablet on each film taken out from my meter. I have provided a method of producing the latent figures for all ten tablets at one short operation. This may be accomplished in the following manner. On a separate film, such as represented by 22" in Fig. 8, produce ten lightning severity tablets in the manner explained with tablets 1 to 10 inclusive on films 22 and 22' in Figs. 4 and 5. On film 22" lay a plate of opaque material having ten circular holes that will just fit over the tablets. Now assume that film 22 in Fig. 4 has been removed from my meter and that no exposures have yet been made of this film for producing the lightning severity tablets. Place film 22" with the opaque plate thereon on that portion of film 22 between its left-hand end and figure 37, but do this so that the greatest density tablet of film 22" is near the left-hand end of film 22, and the least density tablet of film 22" is near figure 37 on film 22. Preferably, the opaque plate should be on the outside and film 22" next to film 22. This will leave ten circular portions of film 22 under the ten tablets of film 22", and in line with the ten holes of the opaque plate. Now place a standard incandescent electric lamp in front of the opaque plate and energize the lamp for a brief period. Develop film 22. Obviously, all of the above steps should be made in a photographer's dark room. It is clear that the developed figure on this film nearest to its left-hand end will have the least density because it was covered by the greatest density tablet on film 22", and the developed figure on film 22 nearest to its figure 37 will have the greatest density because it was covered by the least density tablet on film 22", and the remaining developed figures on film 22 will have graduated densities between these limits. In other words, the developed figures on film 22 will be as now represented by tablets 1 to 10, inclusive, thereon. In a similar manner the lightning severity tablets on film 22' and any other film removed from my meter can be produced by employing film 22". It is desirable, when using film 22" to produce the latent figures on all films taken from my meter, to use in each case a lamp of the same candle power, have the lamp about the same distance from the film in each case, and impress about the same voltage on the lamp for about the same period in each case. This will cause the corresponding tablets on the different films to have about the same density. The numbers 1 to 10, inclusive, on films 22 and 22' in Figs. 4 and 5, respectively, may be printed thereon manually after the films are developed, or these numbers may be printed on the films when they are originally made, or these numbers may, by methods well known to photographists, be photographically produced on the films at the same time that the lightning severity tablets are produced.

I have described my meter as having in series with lead 18 a resistance which consists of insulation 31 between the terminals of tube 17. It is obvious that in some cases it might be found that the resistance of insulation 31 is too high. In that case an actual resistance should be connected in series with lead 18, so that this resistance in parallel with the resistance of insulation 31 will give the desired effective resistance. This condition may also be represented by Fig. 3, in which 32 would then represent an actual resistance in series with lead 18 and the tube 17 connected across this resistance.

I have described my meter with lead 18 grounded. In some cases, however, the nature of the soil may make it difficult or too expensive to obtain a good ground connection. In that case it will be satisfactory to employ what is called in the art a "counterpoise". This is shown in Fig. 9, in which lead 18, instead of being grounded, is connected to a metallic member 42 supported a short distance above the surface of the earth. The operation of my meter will be the same as that previously described, except that the flow of electrons will occur between the antenna and counterpoise 42.

In Fig. 10, a light-proof receptacle represented by 43 has a cover 44 of insulating material. Inside this receptacle and supported by this cover is a glow tube represented by 45. This glow tube is adapted to emit actinic rays when a voltage in excess of a predetermined value is impressed thereon, this value being hereafter called the critical tube voltage. The tube consists of a glass bulb 46 filled with some gas that will emit actinic rays when it glows, as for example neon gas. Inside of bulb 46 are two coaxial spaced apart tapering electrodes 47 and 48, with their smaller ends adjacent to each other and their opposite ends secured to metallic caps 49 which are clamped over opposite end portions of the bulb. Each cap 49 is held by a separate metallic clamp 50 which is secured to a metallic terminal 51. The two terminals 51 are supported by cover 44 by means of the nut and washer arrangement shown on the cover. The two terminals are connected across an actual resistance 52, which is connected in series with lead 18. The length of that portion of cover 44 which is between terminals 51 is usually so great that the resistance of this portion is too high to be used as the only resistance, and, therefore, I have shown the actual resistance 52 connected in series with lead 18, so that this resistance in parallel with that of insulation 44 between terminals 51 will give the desired effective resistance. If, however, the resistance of insulation 44 between terminals 51 is of the correct value, then resistance 52 may be omitted. Rotatably mounted inside of receptacles 43 is a drum 53 which carries on its periphery a sensitized film 54 which is held in place on the drum by a wedge 55. This drum is rotated one revolution during a week by an eight-day spring-driven clock motor, represented by 56. It is unnecessary to show the details of this clock motor, as it is well known to those skilled in this art. A winding stem 57 is shown, for winding up the spring of the clock motor. It is clear from the figure that clock motor 56 moves film 54 in a direction which is substantially perpendicular to the axis of electrodes 47 and 48. Between tube 45 and drum 53 is an opaque partition 58 having an aperture covered by a double convex spherical lens 59. The structure of this lens and its position between film 54 and the electrodes 47 and 48 are such that it will produce on the film an inverted image of the glowing portion of the gas at either electrode.

From the description given of Figs. 1 and 2, it should be obvious that if a positively charged cloud suddenly discharges in the vicinity of the meter there will be a glow of the gas at electrode 48, whereas if a negatively charged cloud suddenly discharges in the vicinity of the meter there will be a glow of the gas at electrode 47. The characteristic of tube 45 is such that when the voltage impressed thereon just exceeds its critical voltage, there is a glow of the gas at the cathode electrode for a very short distance from its small end, and as the current through the tube is further increased, the glow extends farther up the electrode in such a manner that the intensity of the glow remains substantially constant. I have purposely shown electrodes 47 and 48 tapered, because this increases the current range of tube 45 before the glow extends over the whole length of the cathode electrode, but it is obvious that where the current range permits it will be satisfactory to have these electrodes of uniform dimensions throughout their lengths.

Now assume that the clock motor 56 in Fig. 10 was started and allowed to run for a week during which there were many lightning discharges in the vicinity of the meter, some discharges being due to positively charged clouds and others due to negatively charged clouds, and at the end of the week the clock motor was stopped and the film removed and developed. It is clear that the developed figures on the film may, for example, be represented by the four groups of figures 60, 61, 62 and 63 shown on film 54 in Fig. 11. Each figure will be a clear inverted image of the glow that took place at the cathode when the particular lightning discharge occurred, because it must be remembered that a lightning discharge lasts only a few micro-seconds and during this very brief period the drum 53 is practically stationary. The group of figures 60 and 61 may, for example, be due to the lightning discharges from positively charged clouds, and the group of figures 62 and 63 will then be due to the lightning discharges from negatively charged clouds. The height of each figure in groups 60 to 63, inclusive, is a function of the severity of the lightning discharge that caused the latent image from which the particular figure was developed; the longer the figure is, the more severe was the lightning discharge, and vice-versa. By comparing the heights of these figures it is possible to determine the relative severities of the individual lightning discharges during the week. It is obvious that the length of each figure is also a measure of the electrostatic potential difference between sphere 13 and the earth just after the particular lightning discharge that produced the latent image from which the figure was developed.

By integrating the areas of all these figures and comparing the total area with that of the figures on another film which was developed after being in the meter for a week, it is possible to determine the relative integrated severities of the lightning storms during the two weeks. In a similar manner the relative integrated severities of lightning storms at a given locality may be determined week by week, or any other period, over the entire lightning season, or the relative integrated severities of lightning storms at different localities may be determined during the same period by installing at least one of my meters in each locality. Furthermore, the film has printed thereon the days of the week. It is, therefore, possible to determine when each lightning discharge occurred, the relative severity thereof, and the relative integrated severities of all the lightning discharges during a given period as compared with a different period. It should now be obvious that by installing one or more of the meters shown in Fig. 10 near a transmission system in the manner explained in connection with the meter shown in Fig. 1, the information obtainable from the one or more meters of the type shown in Fig. 10, when correlated with a record kept of the number of trip outs on the transmission system and when they occurred, will serve as a reliable and valuable guide for intelligent action towards achieving one of the goals of every progressive company operating a transmission system—namely, the reducing to a minimum the number of trip outs caused by lightning storms. It should also be obvious that when a plurality of the meters shown in Fig. 10 are installed in the manner described in connection with the meter shown in Fig. 1, the information obtainable from the meters of the type shown in Fig. 10 will serve as a reliable and valuable guide for intelligently determining which of several proposed routes is best for a new transmission system, or which of several proposed sites is best for a new ammunition depot, or for a new explosive material plant, or for an oil refinery, etc.

It is also obvious that the meter shown in Fig. 10 may have its lead 18 connected to a "counterpoise" as shown in Fig. 9, instead of being grounded, and the operation of the meter will be identical with that described.

In accordance with the provisions of the patent statutes, I have described the principles of operation of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States, is:

1. Apparatus for producing a record which is a measure of the electrostatic potential difference between an electrically charged body and an electrically conducting member in spaced relationship thereto, said apparatus comprising a second electrically conducting member, means for supporting the second mentioned conducting member in the electrostatic field between the charged body and the first mentioned conducting member, means including an electrical impedance for connecting together said conducting members, an electric discharge device, adapted to emit actinic rays when a voltage in excess of a predetermined value is impressed thereon, connecting means for impressing on said discharge device a voltage whose magnitude is responsive to the voltage across said impedance, a light-proof receptacle and a sensitized element supported within said receptacle at a distance from said discharge device, said discharge device, receptacle, and sensitized element being so adapted and arranged that a beam of said actinic rays impinges on the sensitized element.

2. Apparatus for producing a record which is a measure of the electrostatic potential difference between an electrically charged body and an electrically conducting member in spaced relationship thereto, said apparatus comprising a second electrically conducting member, means for supporting the second mentioned conducting member in the electrostatic field between the charged body and the first mentioned conducting member, means including a resistance for connecting together said conducting members, a light-proof receptacle, a glow tube within said receptacle adapted to emit actinic rays when a voltage in excess of a predetermined value is impressed thereon, means for connecting said glow tube across said resistance, and a sensitized element supported within said receptacle and arranged to have a beam of said actinic rays impinge thereon.

3. In combination, an electrically conducting member, means for supporting said conducting member in the earth's atmosphere, a second electrically conducting member underneath the first mentioned conducting member, means including an electrical impedance for connecting together said conducting members, an electric discharge device adapted to emit actinic rays when a voltage in exces of a predetermined value is impressed thereon, connecting means for impressing on said discharge device a voltage whose magnitude is responsive to the voltage across said impedance, a light-proof receptacle, and a sensitized element supported within said receptacle at a distance from said discharge device, said discharge device receptacle, and sensitized element being so arranged that a beam of said actinic rays impinges on the sensitized element.

4. In combination, an electrically conducting member, means for supporting said conducting member at a predetermined distance above the surface of the earth, means including an electrical impedance for connecting said conducting member to the earth, an electric discharge device adapted to emit actinic rays when a voltage in excess of a predetermined value is impressed thereon, connecting means for impressing on said discharge device a voltage whose magnitude is responsive to the voltage across said impedance, a light-proof receptacle, and a sensitized element supported within said receptacle at a distance from said discharge device, said discharge device, receptacle, and sensitized element being so arranged that a beam of said actinic rays impinges on the sensitized element.

5. In combination, an electrically conducting member, means for supporting said conducting member in the earth's atmosphere, a second electrically conducting member underneath the first mentioned conducting member, means including a resistance for connecting together said conducting members, a light-proof receptable, a glow tube within said receptable adapted to emit actinic rays when a voltage in excess of a predetermined value is impressed thereon, means for connecting said glow tube across said resistance, and a sensitized element supported within said receptacle and arranged to have a beam of said actinic rays impinge thereon.

6. In combination, an electrically conducting member, means for supporting said conducting member at a predetermined distance above the surface of the earth, means including a resistance for connecting said conducting member to the earth, a light-proof receptacle, a glow tube within said receptacle adapted to emit actinic rays when a voltage in excess of a predetermined value is impressed thereon, means for connecting said glow tube across said resistance, and a sensitized element supported within said receptacle and arranged to have a beam of said actinic rays impinge thereon.

7. In combination, two electrically conducting members, means for supporting said conducting members in a spaced relationship one above the other in a vertical plane above the surface of the earth, means including a resistance for connecting together said conducting members, a light-proof receptacle, a glow tube within said receptacle adapted to emit actinic rays when a voltage in excess of a predetermined value is impressed thereon, means for connecting said glow tube across said resistance, and a sentitized element supported within said receptacle and arranged to have a beam of said actinic rays impinge thereon.

8. In combination, an electrically conducting member, means for supporting said conducting member in the earth's atmosphere, a second electrically conducting member underneath the first mentioned conducting member, a light-proof receptacle, a glow tube within said receptacle adapted to emit actinic rays when a voltage in excess of a predetermined value is impressed on its terminals, said glow tube having its terminals separated by an insulating medium of suitable character and thickness so as to form a high resistance electrically conducting path directly between these terminals, means including said glow tube for connecting together said conducting members, the connections to said glow tube being made at its terminals, and a sensitized element supported within said receptacle and arranged to have a beam of said actinic rays impinge thereon.

9. In combination, two spaced apart electrically conducting members, means including an electrical impedance for connecting together said conducting members, a light-proof receptacle, a glow tube within said receptacle having two coaxial spaced apart electrodes, said glow tube being adapted to emit actinic rays when a voltage in excess of a predetermined value is impressed on its electrodes, means for connecting the electrodes of said glow tube across said impedance, a sensitized strip supported within said receptacle, an opaque member between said glow tube and said sensitized strip, said opaque member having a transparent portion adapted to focus an image of the glow in said tube on said sensitized strip, and means for moving said sensitized strip past said transparent portion.

10. A lightning severity measuring device comprising an electrically conducting member, means for so supporting said conducting member in the earth's atmosphere that the conducting member is exposed only to the electrostatic field in the atmosphere, means including a resistance for connecting said conducting member to the earth, a light-proof receptacle, a glow tube within said receptacle adapted to emit actinic rays when a voltage in excess of a predetermined value is impressed thereon, means for connecting said glow tube across said resistance, and a sensitized element supported within said receptacle and arranged to have a beam of said actinic rays impinge thereon.

11. A lightning severity measuring device comprising an electrically conducting member, means for so supporting said conducting member in the earth's atmosphere that the conducting member is exposed only to the electrostatic field in the atmosphere, a light-proof receptacle, a glow tube within said receptacle adapted to emit actinic rays when a voltage in excess of a predetermined value is impressed thereon, said glow tube having its terminals separated by an insulating medium of suitable character and thickness so as to form a high resistance electrically conducting path directly between these terminals, means including said glow tube for connecting said conducting member to the earth, the connections to said glow tube being made at its terminals, and a sensitized element supported within said receptacle and arranged to have a beam of said actinic rays impinge thereon.

12. A lightning severity measuring device comprising an electrically conducting member, means for so supporting said conducting member in the earth's atmosphere that the conducting member is exposed only to the electrostatic field in the atmosphere, means including a resistance for connecting said conducting member to the earth, a light-proof receptacle, a glow tube within said receptacle having two coaxial spaced apart electrodes, said glow tube being adapted to emit actinic rays when a voltage in excess of a predetermined value is impressed on its electrodes, means for connecting the electrodes of said glow tube across said resistance, a sensitized strip supported within said receptacle, an opaque member between said glow tube and said sensitized strip, said opaque member having a transparent portion adapted to focus an image of the glow in said tube on said sensitized strip, and means for moving said sensitized strip past said transparent portion.

13. A device for producing a latent photographic figure which is a measure of the electrostatic potential difference between the earth and an electrically conducting member supported thereabove just after a lightning discharge in the vicinity thereof, said device comprising means including a resistance for connecting said conducting member to the earth, a light-proof receptacle, a glow tube within said receptacle adapted to emit actinic rays when a voltage in excess of a predetermined value is impressed thereon, means for connecting said glow tube across said resistance, a sensitized element supported within said receptacle at a distance from said glow tube, and an opaque member between said glow tube and said sensitized element, said opaque member having a transparent portion for permitting a beam of said actinic rays to impinge upon a portion of said sensitized element.

14. A device for producing a latent photographic figure which is a measure of the electrostatic potential difference between the earth and an electrically conducting member supported thereabove just after a lightning discharge in the vicinity thereof, said device comprising a light-proof receptacle, a glow tube within said receptacle adapted to emit actinic rays when a voltage in excess of a predetermined value is impressed on its terminals, said glow tube having its terminals separated by an insulating medium of suitable character and thickness so as to form a high resistance electrically conducting path directly between these terminals, means including said glow tube for connecting said conducting member to the earth, the connections to the glow tube being made at its terminals, and a sensitized element supported within said receptacle at a distance from said glow tube and arranged to have a beam of said actinic rays impinge thereon.

15. A device for producing a latent photographic figure which is a measure of the electrostatic potential difference between the earth and an electrically conducting member supported thereabove just after a lightning discharge in the vicinity thereof, said device comprising means including an electrical impedance for connecting said conducting member to the earth, a light-proof receptacle, a glow tube within said receptacle having two coaxial spaced apart electrodes, said glow tube being adapted to emit actinic rays when a voltage in excess of a predetermined value is impressed on its electrodes, means for connecting the electrodes of said glow tube across said impedance, a sensitized strip supported within said receptacle, an opaque member between said glow tube and said sensitized strip, said opaque member having a transparent portion adapted to focus an image of the glow in said tube on said sensitized strip, and means for moving said sensitized strip past said transparent portion.

16. A device for producing a latent photographic figure which is a measure of the electrostatic potential difference between the earth and an electrically conducting member supported thereabove just after a lightning discharge in the vicinity thereof, said device comprising means including a resistance for connecting said conducting member to the earth, a light-proof receptacle, a glow tube within said receptacle having two coaxial spaced apart tapering electrodes arranged with their smaller ends adjacent to each other, said glow tube being adapted to emit actinic rays when a voltage in excess of a predetermined value is impressed on its electrodes, means for connecting the opposite ends of said electrodes across said resistance, a sensitized strip supported within said receptacle, an opaque member between said tube and said sensitized strip, said opaque member having an aperture covered by a lens adapted to focus an image of the glow in said tube on said sensitized strip, and means for moving said sensitized strip in a direction which is substantially perpendicuar to the axis of said eectrodes.

17. The method of producing a record which is a measure of the electrostatic potential difference between two spaced apart electrically charged members just prior to a discharge therebetween, which consists in accumulating a quantity of electricity which is a function of the intensity of the electrostatic field between the charged members just prior to the discharge therebetween, draining the accumulated quantity of electricity after the discharge has occurred, utilizing the electricity being drained to produce a beam of actinic rays whose intensity and duration are functions of the quantity of accumulated electricity and the rate at which the latter is drained, exposing a sensitized element to the beam of actinic rays to obtain a latent figure, and developing the exposed sensitized element to obtain a visible figure.

18. The method of producing a record which is a measure of the integrated severities of a plurality of lightning discharges during a given period in a given locality, which consists in accumulating prior to each lightning discharge in the locality a quantity of electricity which is a function of the intensity of the electrostatic field in that locality just prior to the lightning discharge, draining the accumulated quantity of electricity after each lightning discharge, utilizing the electricity being drained to produce a beam of actinic rays whose intensity and duration are functions of the quantity of accumulated electricity and the rate at which the latter is drained, exposing the same portion of a sensitized element to the beam of actinic rays produced after each lightning discharge during the given period to obtain a latent figure, developing the exposed portion of the sensitized element to obtain a visible figure, and measuring the density of the developed figure.

19. The method of determining the electrostatic field intensity between two spaced apart electrically charged members just prior to a discharge therebetween, which consists in accumulating a quantity of electricity which is a function of the intensity of the electrostatic field between the charged members just prior to the discharge therebetween, draining the accumulated quantity of electricity after the discharge has occurred, utilizing the electricity being drained to produce a beam of actinic rays whose intensity and duration are functions of the quantity of accumulated electricity and the rate at which the latter is drained, exposing a sensitized element to the beam of actinic rays to obtain a latent figure, exposing several portions of the same sensitized element to different numbers of flashes of actinic rays of predetermined intensity and duration, developing the exposed sensitized element to obtain a visible figure which is a measure of the intensity of the electrostatic field between the charged members and to obtain a plurality of visible comparison tablets, and measuring the densities of the figure and tablets.

HARRY B. MARVIN.